United States Patent

[11] 3,622,580

[72] Inventors Otto Hromatka
Vienna XIX;
Maximilian Knollmuller, Vienna III; Kurt A. Maier, Vienna XIX, all of Austria
[21] Appl. No. 810,344
[22] Filed Mar. 25, 1969
[45] Patented Nov. 23, 1971
[73] Assignee Smith Kline & French Laboratories
Philadelphia, Pa.

[54] PIPERAZINO-ACETYLAMINO-9-FLUORENONES AND-ANTHRAQUINONES
7 Claims, No Drawings
[52] U.S. Cl............................................... 260/268,
260/376, 260/381, 260/544, 260/562, 260/578,
424/250
[51] Int. Cl....................................................... C07d 51/70
[50] Field of Search........................................... 260/268 TR

[56] References Cited
UNITED STATES PATENTS

| | | | |
|---|---|---|---|
| 2,585,555 | 2/1952 | Jenny et al..................... | 260/268 |
| 3,294,803 | 12/1966 | Rosi ............................. | 260/268 X |
| 3,418,064 | 12/1968 | Buechler....................... | 260/268 X |
| 3,519,642 | 7/1970 | Wedemeyer et al. ......... | 260/268 X |

*Primary Examiner*—Donald G. Daus
*Attorneys*—William H. Edgerton, Richard D. Foggio, Joan S. Keps, Alan D. Lourie and Joseph A. Marlino ABSTRACT: 1-[(4-Methyl-1-piperazinyl)-acetylamino]-9-fluorenones and-anthraquinones optionally substituted in the 4-position by chlorine, bromine, hydroxy or nitro have antipyretic activity. They are generally prepared by reaction of a 1-(α-haloacetylamino)-9-fluorenone or-anthraquinone with N-methylpiperazine.

PIPERAZINO-ACETYLAMINO-9-FLUORENONES AND-ANTHRAQUINONES

This invention relates to novel substituted 1-acetylamino-9-fluorenones and-anthraquinones which have useful pharmacodynamic activity. More specifically the compounds of this invention have antipyretic activity as demonstrated in standard laboratory animals. For example the temperature of fevered rats is decreased upon oral administration of doses of 100–200 mg./kg.

The 1-acetylamino-9-fluorenones and-anthraquinones of this invention are represented by the following general structural formula:

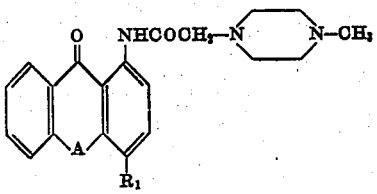

Formula I wherein:

A represents a single valence bond or a carbonyl group; and $R_1$ represents hydrogen, chlorine, bromine, hydroxy or nitro, preferably hydrogen, chlorine or bromine.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicyclic, methanesulfonic, esthanedisulfonic acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of formula I are prepared according to the following synthetic method:

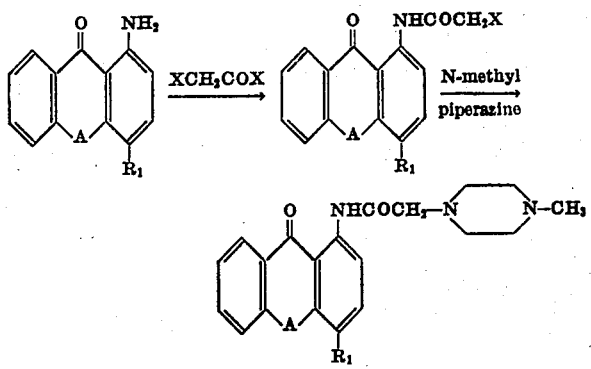

wherein A and $R_1$ are as defined above and X is chlorine or bromine. Thus the 1-amino-9-fluorenone or 1-aminoanthraquinone is reacted with an α-haloacetyl halide to yield the 1-(α-haloacetylamino) derivative. The latter is treated with n-methylpiperazine to give the product. Alternatively, when an α-chloroacetylamino intermediate is employed, the chlorine can be exchanged with iodine by reaction with sodium iodide in acetone to give the more reactive α-iodoacetylamino derivative which is similarly reacted as above to give the product.

The compounds of this invention may be administered orally or parenterally in conventional dosage unit forms such as tablets, capsules, injectables or the like, by incorporating the appropriate dose of a compound of formula I, or an appropriate salt thereof, with carriers according to accepted pharmaceutical practices.

The foregoing is a general description of how to prepare the compounds of this invention. The following examples illustrate the preparation of a specific compounds having antipyretic activity. However this should not be construed as limiting the scope of the invention since appropriate variations in the starting materials will produce other corresponding products set forth in formula I.

PREPARATIONS

A. 1-Chloroacetylamino-9-fluorenone

A solution of 12.5 g. of 1-amino-9-fluorenone in 500 ml. of benzene is mixed with a solution of 17 g. of chloroacetyl chloride in 50 ml. of benzene. The suspension formed is mixed and shaken with 2N potassium hydroxide until the aqueous phase remains alkaline. The benzene solution is washed, dried and evaporated to yield 1chloroacetylamino-9-fluorenone, m.p. 163°–165° C.

B. 4-Bromo-1-chloroacetylamino-9-fluorenone

4-Bromo-1-amino-9-fluorenone (7.72 g.) is dissolved in 400 ml. of boiling benzene, 20 g. of potassium carbonate is added and a solution of 5.65 g. of chloroacetyl chloride in 50 ml. of benzene is added dropwise over 20 minutes. The mixture is heated under reflux for 3 1/2 hours, filtered hot and then cooled to give 4-bromo-1-chloroacetyl-amino-9-fluorenone, m.p. 190°–192° C.

C. 1-Iodoacetylamino-9-fluorenone a mixture of 12.9 g. of 1-chloroacetylamino-9-fluorenone and 10.0 g. of sodium iodide in 700 ml. of dry acetone is refluxed for 7 hours, filtered hot and concentrated to give 1-iodoacetylamino-9-fluorenone, m.p. 165°–166° C.

Similarly, 4-bromo-1-iodoacetylamino-9-fluorenone is prepared m.p. 180.5°–182° C.

D. 1-Iodoacetylaminoanthraquinones

A 1-chloroacetylaminoanthraquinone is extracted via a Soxhlet extractor into a solution of sodium iodide in dry acetone to give the corresponding iodo derivative. Reaction conditions and melting points of $R_1$ -substituted iodoacetylaminoanthraquinones are as follows:

| $R_1$ | Chloro (g.) | Sodium Iodide (g.) | Acetone (ml.) | Length of Extraction (hrs.) | Melting Point, °C. |
|---|---|---|---|---|---|
| CL | 15.5 | 12.0 | 300 | 8 | 196–197 |
| $NO_2$ | 11.0 | 8.0 | 350 | 15 | 239–241 |
| OH | 2.5 | 2.0 | 270 | 3 | 208–212 |

A solution of 2.8 g. of N-methylpiperazine in 50 ml. of absolute benzene is added dropwise over 1 1/2 hours to a solution of 5.08 g. of 1-iodoacetylamino-9-fluorenone in 250 ml. of absolute benzene. The mixture is refluxed for 2 hours, filtered and shaken with water. Extraction with dilute hydrochloric acid followed by basifying the acid extract with alkali and further extraction with ether/chloroform yields upon evaporation the dried organic extract 1-[(4-methyl-1-piperazinyl)-acetylamino]-9-fluorenone, m.p. 163°–165° C.

Example 2

A solution of 1.5 g. of N-methylpiperazine in 50 ml. of absolute toluene is added dropwise over 2 1/2 hours to a solution of 3.0 g. of 4-bromo-1-iodoacetylamino-9-fluorenone in 200 ml. of absolute toluene. The hot solution is filtered, cooled and extracted with 0.5 N hydrochloric acid solution. The acid extract is neutralized with sodium carbonate and made alkaline with 30 percent sodium hydroxide solution. By extraction with ether/chloroform there is obtained 4-bromo-1-[(4-methyl-1-piperazinyl)-acetylamino]-9-fluorenone, m.p. 188°–191.5° C.

EXAMPLE 3

A mixture of 3.0 g. of 1-iodoacetylaminoanthraquinone and 1.5 g. of N-methylpiperazine in 200 ml. of toluene is refluxed for 3 hours, cooled and filtered. The filtrate is extracted with dilute hydrochloric acid and the acid extract is shaken with benzene, then made alkaline. The alkaline extract is extracted with benzene and the benzene solution is dried and evaporated to give 1-]-(4-methyl-1-piperazinyl)-acetylamino]-anthraquinone, m.p. 194°–196° C.

EXAMPLE 4

A mixture of 5.0 g. of 4-chloro-1-iodoacetylaminoanthraquinone and 4.0 g. of N-methylpiperazine in 250 ml. of toluene is refluxed for 2 hours, cooled and filtered. The filtrate is extracted with dilute hydrochloric acid and the acid extract is made alkaline. The precipitate is washed with water, then alcohol to yield 4-chloro-1-]-(4-1-piperazinyl)-acetylamino]-anthraquinone, m.p. 228°–299° C. Dec.

Similarly, reaction with 4-hydroxy-1-iodoacetylamino-anthraquinone yields the corresponding 4-hydroxy-1-]-(4-methyl-1-piperazinyl)-acetylamino]-anthraquinone.

EXAMPLE 5

A mixture of 8.8 g. of 1-iodoacetylamino-4-nitroanthraquinone and 8.0 g. of N-methylpiperazine in 250 ml. of toluene is refluxed for 2 hours, cooled and filtered. The filtrate is extracted with dilute hydrochloric acid, the precipitate is washed with hot water and the undissolved residue is added to the acid extract. The latter is made alkaline, extracted with benzene/chloroform (2:1), dried and evaporated to give 1-[(4-methyl-1-piperazinyl)-acetylamino]-4-nitroanthraquinone, m.p. 206°–208° C.

What is claimed is:

1. A chemical compound or a pharmaceutically acceptable acid addition salt thereof, said compound having the following formula:

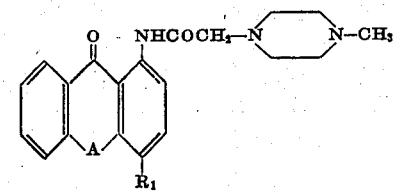

in which:
A is a single valence bond or a carbonyl group; and
R1 is hydrogen, chlorine, bromine, hydroxy, or nitro.

2. A chemical compound according to claim 1 in which A is a single valence bond.

3. A chemical compound according to claim 2 in which R1 is hydrogen.

4. A chemical compound according to claim 2 in which R1 is bromine.

5. A chemical compound according to claim 1 in which A is a carbonyl group.

6. A chemical compound according to claim 5 in which R1 is hydrogen.

7. A chemical compound according to claim 5 in which R1 is chlorine.